(12) United States Patent
Oechslen et al.

(10) Patent No.: US 12,744,430 B2
(45) Date of Patent: Sep. 22, 2026

(54) EXPANSION TANK FOR A COOLING SYSTEM, AS WELL AS A COOLING SYSTEM FOR AN ELECTRIC TRACTION MACHINE FOR A MOTOR VEHICLE

(71) Applicant: Dr. Ing. h.c. F. Porsche Aktiengesellschaft, Stuttgart (DE)

(72) Inventors: Stefan Oechslen, Stuttgart (DE); Simon Kuebler, Gemmingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 343 days.

(21) Appl. No.: 18/450,425

(22) Filed: Aug. 16, 2023

(65) Prior Publication Data

US 2024/0063692 A1 Feb. 22, 2024

(30) Foreign Application Priority Data

Aug. 19, 2022 (DE) ..................... 10 2022 121 047.2

(51) Int. Cl.
*H02K 9/193* (2006.01)
*H02K 7/00* (2006.01)

(52) U.S. Cl.
CPC ............. *H02K 9/193* (2013.01); *H02K 7/006* (2013.01)

(58) Field of Classification Search
CPC ............................... H02K 9/193; H02K 7/006
USPC ......................................... 310/52, 54, 58, 59
See application file for complete search history.

(56) References Cited

U.S. PATENT DOCUMENTS 11,623,508 B2 4/2023 Oechslen
2010/0132817 A1* 6/2010 Hewkin ............... B01D 35/027 137/544
2010/0175377 A1 7/2010 Hippen et al.
2021/0379983 A1 12/2021 Baillie et al.
2023/0125205 A1 4/2023 Kunatharaju et al.
2023/0256810 A1 8/2023 Oechslen et al.

FOREIGN PATENT DOCUMENTS

DE 102009001871 A1 * 9/2010 ........... F04D 29/586
DE 112010000875 B4 5/2015
DE 102019117893 A1 1/2021
DE 112019004907 T5 6/2021
DE 102022208812 A1 4/2023
DE 102022103357 A1 8/2023
EP 3375824 B1 11/2020

* cited by examiner

*Primary Examiner* — Jose A Gonzalez Quinones
(74) *Attorney, Agent, or Firm* — LEYDIG, VOIT & MAYER, LTD.

(57) ABSTRACT

An expansion tank for a cooling system includes at least one inlet for a coolant oil, a first outlet for the coolant oil, a second outlet for a gas, and a connecting channel between the at least one inlet and the first and second outlets. By a horizontal offset, one of the inlets for the coolant oil and the second outlet for a gas are always arranged above the first outlet for the coolant oil in an installation situation in any operating state. A filter medium for removing particles and/or water from the coolant oil is provided between the at least one inlet and the first outlet.

7 Claims, 2 Drawing Sheets

EXPANSION TANK FOR A COOLING SYSTEM, AS WELL AS A COOLING SYSTEM FOR AN ELECTRIC TRACTION MACHINE FOR A MOTOR VEHICLE

CROSS REFERENCE TO RELATED APPLICATIONS

This application claims benefit to German Patent Application No. DE 10 2022 121 047.2, filed on Aug. 19, 2022, which is hereby incorporated by reference herein.

FIELD

The invention relates to an expansion tank for a cooling system, a cooling system for an electric traction machine for a motor vehicle, and a thermal management module having such a cooling system for a powertrain of a motor vehicle.

BACKGROUND

From the prior art, cooling systems for electric traction machines are known for dissipating the resulting waste heat in case of a power demand. For increased cooling capacity, the idea is to directly perfuse at least the stator of an electric traction machine with a coolant, wherein the coolant is to be made as a dielectric coolant. It is sensible to cool as few components as possible in this dielectric cooling system. Other components of a powertrain in which such an electric traction machine is integrated, such as a transmission and a pulse inverter, are preferably cooled in at least one separate cooling circuit. For example, a transmission is cooled by means of an oil circuit such that the coolant (oil) is simultaneously formed so as to lubricate the transmission components. For example, a pulse inverter is arranged in a water circuit, with which further vehicle components are preferably coolable.

Due to very low but unavoidable leakages of a water-conducting system and/or moisture entry via ambient air into a circuit system, water inclusions in the coolant oil are produced. It is notable that water entry can occur in such large amounts that this can reduce the insulation effect of the dielectric coolant oil over the course of a desired service life.

SUMMARY

In an embodiment, the present disclosure provides an expansion tank for a cooling system comprising at least one inlet for a coolant oil, a first outlet for the coolant oil, a second outlet for a gas, and a connecting channel between the at least one inlet and the first and second outlets. By a horizontal offset, one of the inlets for the coolant oil and the second outlet for a gas are always arranged above the first outlet for the coolant oil in an installation situation in any operating state. A filter medium for removing particles and/or water from the coolant oil is provided between the at least one inlet and the first outlet.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
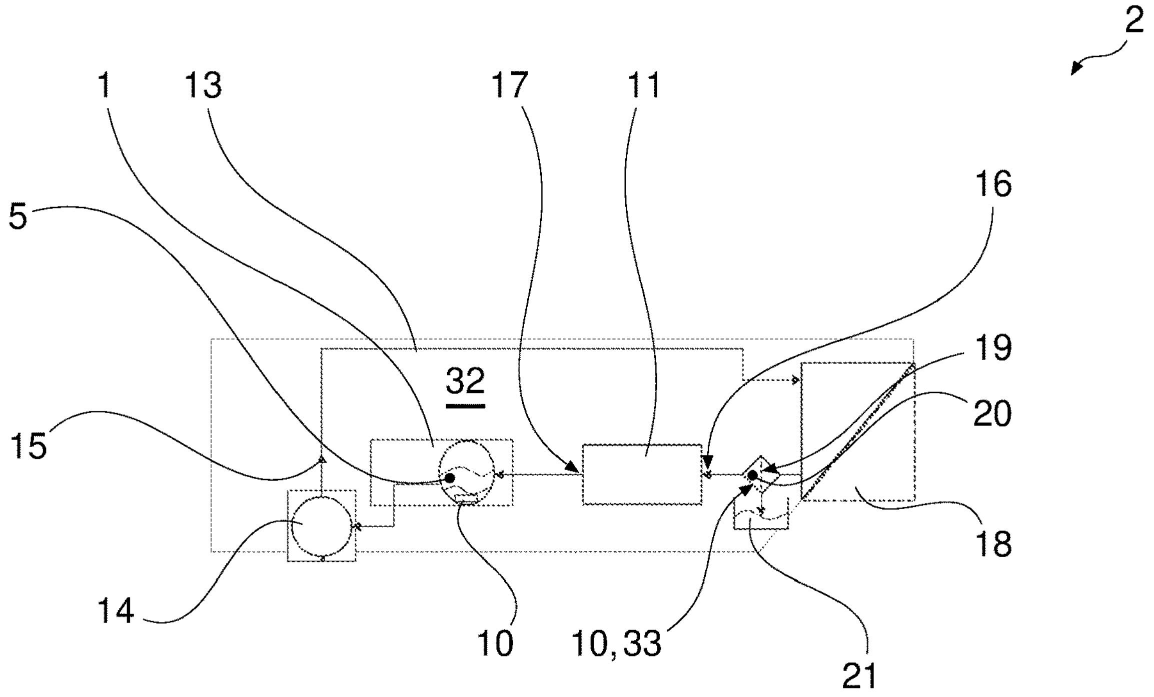
FIG. 1 illustrates a cooling system with two filter stages in a schematic circuit diagram.

In an embodiment, the present invention provides features to at least partially overcome the disadvantages known from the prior art. Embodiments of the present invention can be combined in any technically meaningful manner, wherein the explanations from the following description as well as features from the figures, which comprise supplementary configurations of embodiments of the invention, can also be used for this purpose.

An embodiment of the invention relates to an expansion tank for a cooling system comprising at least the following components:

- at least one inlet for a coolant oil;
- a first outlet for the coolant oil;
- a second outlet for a gas; and
- a connecting channel between the at least one inlet and the outlets, wherein, by means of a horizontal offset, one of the inlets for the coolant oil and the second outlet for a gas are always arranged above the first outlet for the coolant oil in the installation situation in any operating state.

The expansion tank is characterized in particular in that a filter medium for removing particles and/or water from the coolant oil is provided between the at least one inlet and the first outlet.

Ordinal numbers used in the description above and below are used only for clear differentiation and do not reflect any order or ranking of the designated components, unless explicitly indicated otherwise. An ordinal number greater than one does not necessitate that a further such component must necessarily be present.

In this case, an expansion tank is described, in which it is ensured by a horizontal offset in the corresponding installation situation in each operating state that the inlet for the coolant is always arranged above the first outlet for the coolant oil. In an application in a motor vehicle, such an expansion tank is subject to strong accelerations, primarily in the transverse direction and in the longitudinal direction of the motor vehicle, i.e. in the directions transverse to the gravitational field of the earth.

The expansion tank comprises an inlet for the coolant oil, which enters the expansion tank, for example, after circulating in a cooling system. In one application, the inlet of an electric traction machine is arranged immediately downstream. Furthermore, a first outlet is provided, via which the coolant oil is further circulated in the cooling system or the circuit system. For example, the first outlet is arranged immediately upstream of a circulation pump. The coolant oil enters the circuit system for further conveyance via the first outlet, while being separated as far as possible from gas inclusions. Furthermore, a second outlet is provided, via which gas which is separated from the coolant oil or displaced due to a volume increase of the coolant oil (for example, due to temperatures) can be discharged. It should be noted that, in a preferred embodiment, the second outlet is also an inlet for a gas if the volume of the coolant oil decreases and gas is drawn in from the outside in order to avoid the occurrence of excessive underpressure. However, it should also be noted that the outlet does not necessarily face an open environment, but in one embodiment, can also be connected to a further chamber, and an excessive pressure increase or pressure drop in the coolant oil or in the circuit system is prevented here by means of good compressibility and a corresponding volume of gas.

A connecting channel is provided between the inlet and the outlets to conduct the coolant oil. Now an offset channel is provided here, which is horizontal in the installation situation, wherein the offset preferably has approximately the same horizontal distance to the extremum of the horizontal extension of the connecting channel as the vertical distance. This ensures that the highest point is always formed for the coolant oil from this inlet, even if an overall acceleration deviating from the geometry is present due to an overlay of earth acceleration by vehicle acceleration. Thus, a degassing section within the expansion tank is maximized, so that the expansion tank is thereby particularly efficient for avoiding gas inclusions in the coolant oil.

The expansion tank comprises a filter medium for removing particles and/or water from the coolant oil in the direction of flow between the at least one inlet and the first outlet. By means of this arrangement, it is ensured on the one hand that no or only a small amount of water is fed into the cooling system via the first outlet. On the other hand, with a pure separator, there is no need for a collection tank, since the water is permanently retainable here. In an advantageous embodiment, the filter medium is arranged at a low, preferably the lowest, point of the connecting channel so that the denser water rests here and is exposed to a low flow rate or shear flow, so that the water which is already separated is not mingled with the coolant oil, or is only mingled in negligible amounts.

In an advantageous embodiment, a second inlet for the coolant oil is provided, wherein this is preferably located below the fluid level when the expansion tank is operated in a cooling system. For example, the second inlet is arranged at approximately the same height as the first outlet for the coolant oil. In a preferred embodiment, the coolant oil is then supplied to the expansion tank via both the first inlet (as described above) and the second inlet, such that the degassing path for the coolant oil, which enters the expansion tank via the second inlet, is significantly shortened, but the circulation pump is safely prevented from attracting gaseous constituents in greater quantity in an operating state (i.e., so-called air-drawing is avoided).

According to an aspect, a cooling system for an electric traction machine is described, comprising at least the following components:

- a circuit system for conducting a coolant oil to be circulated;
- a circulation pump for conveying the coolant oil in the circuit system in a first circulation direction;
- a motor input connection for fluidically connecting the circuit system on the input side to an electric traction machine to be temperature-controlled;
- a motor output connection for fluidically connecting the circuit system on the output side to the electric traction machine to be temperature-controlled; and
- a first heat exchanger for dissipating heat from and/or supplying heat to the coolant oil to be circulated in the circuit system.

The cooling system is characterized in particular in that at least one filter medium is provided for removing particles and/or water from the coolant oil.

In advance, it should be noted that, with the cooling system described here, waste heat primarily is to be dissipated, but an increase in the temperature of components temperature-controlled by the cooling system is also a possible operating condition, for example in winter temperatures, so that the components are brought quickly to operating temperature. In most applications, however, waste heat is also to be dissipated in winter temperatures in the operation of an electric traction machine of a motor vehicle, i.e. cooling is the goal.

It should further be noted that, for clarity in terms of components and properties to be described later, components and properties of the cooling system having the same name are respectively designated as "first" components or properties, wherein this is not always done in a clear context.

The cooling system comprises a circuit system comprising a plurality of conduits and/or conduit portions between the components off the cooling system. Within the circuit system, the coolant oil is encapsulated from an environment and thus a loss of gaseous contents as well as an occurrence of (for example, air) moisture and (for example, spray) water from the environment occurs at most in negligible amounts (for example, as a result of leakage). A (first) circulation pump is provided for circulating the coolant oil. A pressure gradient is generated by the circulation pump, resulting in a (first) circulation direction in the circuit system. In one embodiment, the circulation pump is reversibly operable, but the first circulation direction is the main direction of operation, at least when dissipating waste heat from the integrated electric traction machine. A reversal of the direction is adjustable, for example, by reversing the direction of rotation of a pump wheel, but preferably by way of a corresponding way-valve.

An electric traction machine is integrated into the cooling system for temperature control by supplying the coolant oil via a motor input connection and then withdrawing the introduced coolant oil from the electric traction machine again via a motor output connection. It should be noted that when the (first) circulation direction is reversed, an output is formed by the motor input connection, and an input is formed by the motor output connection. Preferably, however, even if the (first) direction of circulation is reversed, the direction of flow via the electric traction machine remains the same, i.e. the motor input connection is an input and the motor output connection is an output for the coolant oil, wherein this is achieved, for example, by means of appropriate conduit routing and/or at least one switchable directional control valve.

The (first) heat exchanger is formed so as to transfer heat between two fluids, i.e. the coolant oil and another fluid (for example water or ambient air). In one embodiment for air cooling, for example, a fan is included.

In one advantageous embodiment, the conduction distance between the electric traction machine and the heat exchanger in the circuit system is as short as possible. Alternatively or additionally, for the same reason, a conduit portion between the heat exchanger and the electric traction machine in the circuit system is thermally isolated and/or spaced as far apart as possible from other heat sources.

Herein, it is now described that at least one filter medium be provided for removing particles and/or water from the coolant oil. By means of the filter medium, water is reliably removable or removed from the circuit. This also applies to particles. Particles are present due to, for example, unclean processing and assembly, as well as due to abrasion or corrosion. Particles are often metallic, and are therefore good electrical conductors.

For example, the filter medium consists of a precipitator, wherein water and particles are inhibited from flowing onwards via mechanical and/or electrostatic rejection. The filter medium is, for example, an adsorbent or absorber, wherein water and/or particles are withdrawn from the coolant oil by adhering, absorbing or reacting.

In one advantageous embodiment, the cooling system is designed to be open or partially open to the environment, wherein air is drawn in from the environment as the volume of the coolant oil drops below a limit value (e.g., as a result of a temperature drop), so as to avoid an unfavorable or even harmful underpressure in the circuit system. In a cooling system with at least one filter medium, it is not absolutely necessary to dry the air from the environment. Such a cooling system is thus free of an (external) air dryer. Such an air dryer consists, for example, of an activated carbon filter or a semi-permeable membrane, which allows water to pass exclusively in negligible amounts.

It is furthermore provided in an advantageous embodiment of the cooling system that at least one of the filter media in the flow order comprise a first filter stage and a second filter stage, wherein the first filter stage comprises a hydrophobically coated screen fabric, and wherein the second filter stage comprises a binding agent for water.

It should be noted in advance that a multi-stage filter medium is not possible only in the combination and/or order mentioned here. This arrangement is only particularly advantageous for the application shown, as will be explained below.

With a hydrophobically coated screen fabric (first filter stage), an efficient water separator is formed, by means of which free water (for example water droplets) is prevented from flowing onwards in the coolant oil. The electrostatic properties of the screen fabric are herein responsible for exerting such large counterforces on the water that a majority of the water cannot pass through the screen fabric contrary to the flow pressure.

An efficient water adsorbent or water absorber is formed with a binding agent (second filter stage). Thus, in addition to free water, dissolved water (i.e. water bound at a molecular level in the coolant oil or a component of the coolant oil) is also separable from the coolant oil and thereby prevented from flowing further.

It has been discovered that a hydrophobically coated screen fabric functions independently of time and (maximum occurring) water volume (in this application case), and above all, also operates reliably for a large amount of water occurring at one time. However, the amount of water that is allowed to pass is too large for some applications, so that an impermissibly high amount of water may remain in the circuit system.

It has been discovered that a binding agent, while very effectively withdrawing the smallest amounts of water from the coolant oil, is insufficient in its function of time and (in this application, maximum occurring) water volume because the binding agent requires a reaction time or reaction distance, and saturation of the binding agent may occur in a lifetime.

In the combination of the hydrophobically coated screen fabric as the first filter stage in the direction of flow with the binding agent as the first filter stage downstream in the direction of flow, the two disadvantages are compensable, or their advantages are mutually useful. Large quantities of water are pre-separated, and remaining small quantities of water or dissolved water are stopped by the binding agent. It is achievable that replacement or regeneration of the filter stages is not necessary over a desired service life, wherein at the same time, no water is contained over this service life, or at least a water content in the coolant oil is sufficiently low for unimpeded operation of the cooling system.

It is furthermore provided, in an advantageous embodiment of the cooling system, that at least one of the filter media comprise a collection tank for receiving particles and/or water.

In this embodiment, at least one of the filter media is capable of permanently separating water and/or particles in large quantities from the coolant oil by means of the associated collection tank. A dead water zone is preferably formed by the collection tank, and the denser water or particles sink into the collection tank, which is installed as low as possible, as a result of earth's gravitational field. In one embodiment, the collection tank is a separate container. In one advantageous embodiment, the collection tank is integrated into a housing of a component of the cooling system; for example, into an oil filter and/or into an expansion tank, preferably the latter as discussed above.

It is furthermore provided in an advantageous embodiment of the cooling system that at least one of the filter media be arranged in the circuit system upstream of the motor inlet connection and downstream of the first heat exchanger.

The closer the filter media are to the electric traction machine at or in the order of flow (in the main flow direction), the better the electric traction machine is protected from electrically conductive elements in the coolant oil. For example, a (for example immediately) upstream (first) heat exchanger in a configuration for transferring heat to water is susceptible to water absorption due to leakage in the capillaries of the first heat exchanger. On the other hand, a conduit portion between them is not very susceptible to leakage, or such leakage is still identifiable and easily rectifiable during a final inspection (quality control) and during regular maintenance. In one advantageous embodiment, due to a relatively high probability of high water quantities as well as high sensitivity of the electric traction machine, a two-stage filter medium, preferably with a collection tank, is provided here.

It is furthermore provided in an advantageous embodiment of the cooling system that it furthermore comprise an expansion tank, which is at least partially filled with the coolant oil to be recirculated in the circuit system and at least partially filled with a gas, wherein the expansion tank according to one embodiment is preferably made according to the above description.

The expansion tank is formed so as to equalize the volume between the circuit system with a coolant oil and an (at least slightly compressible) gas, for example air from an environment, in order to avoid exceeding a predetermined pressure limit depending on changes in temperature within the circuit system. In one embodiment, the expansion tank is made in a closed fashion, wherein a gas in the expansion tank is compressed, and the resulting pressure increase within an operational state according to the design in the circuit system does not exceed a predetermined pressure limit. Alternatively, the expansion tank is made open, wherein a gas from an (immediate) environment (preferably air) is discharged from the expansion tank during a volume increase and sucked in during a volume decrease. In one embodiment, a semi-open expansion tank is provided, in which a gas is discharged and supplied according to the type of open expansion tank; wherein, however, this does not occur from an open environment, but from a connected expansion tank, preferably with a variable volume, for example using a bellows or similar.

Optionally, a further task of the expansion tank is that gas inclusions in the coolant oil are separable as a result of a pressure gradient to the gas, which are discharged to the environment or supplied to an enclosed gas.

In one embodiment according to the above description, the task of retaining water, for example with an integrated function as a collection tank, is also performed by the expansion tank. However, depending on the arrangement, a binding agent is sufficient here, preferably in combination with a further filter medium at a different location in the cooling system, for example between the (first) heat exchanger and the electric traction machine.

In one embodiment, the expansion tank is made to be open to the environment, wherein water entering via a filter medium (for example, via air humidity) and/or particles entering are retained with high efficiency or even completely.

It is further provided in an advantageous embodiment of the cooling system that at least one of the filter media in the circuit system be provided at and/or in the expansion tank, preferably behind the motor output port.

The closer the filter media are arranged to a possible water source (for example, ambient air) in the order of flow (in the main direction), the better the entire cooling system is protected from corrosive and/or electrically conductive interference. In an advantageous embodiment, a two-stage filter medium is provided here due to a, with relatively high probability, high water quantity as well as a high sensitivity of the electric traction machine, especially preferably with a collection tank integrated into the expansion tank. In one advantageous embodiment, this filter medium is used in the cooling system in combination with a further filter medium, for example in the electric traction machine.

It is furthermore provided in an advantageous embodiment of the cooling system that at least one of the filter media comprise a thermal drying device.

In this embodiment, a thermal drying device is provided for regenerating a filter medium. In one embodiment, water is evaporated or vaporized therewith. In one embodiment, the necessary temperature is reduced by means of a catalytic process.

According to an aspect, a thermal management module for a powertrain of a motor vehicle is provided, comprising at least the following components:

- for a transmission, an oil circuit having a second circulation direction and having a second heat exchanger;
- for at least one vehicle component, a water circuit having a third circulation direction and having a third heat exchanger; and
- for an electric traction machine, a cooling system according to one embodiment according to the above description, wherein, preferably, a pulse inverter for the electric traction machine is arranged in the water circuit.

Here, the cooling system described above is integrated into a thermal management module for a powertrain of a motor vehicle, wherein this thermal management module [TMM] is well known for its functions and tasks. In addition to components of a powertrain, other vehicle components are preferably also temperature-controlled, for example a (preferably traction) battery.

Other components of a powertrain in which such an electric traction machine is integrated, such as a transmission and a pulse inverter, are preferably cooled in at least one cooling circuit that is separate from the cooling system. For example, a transmission comprising a (preferably switchable) gearbox and/or a differential is cooled by way of an oil circuit with an oil, preferably directly. A direct cooling is a flow that directly contacts component of the transmission (for example gears), for example as a substitute for a lubricant. For example, the oil circuit is conventionally made. In an advantageous embodiment, a second circulation pump for generating a second circulation direction in the oil circuit is coupled to the first circulation pump for generating the first circulation direction in the circuit system for the coolant oil as a so-called tandem pump, such that a single drive is sufficient for both circulation pumps. The waste heat is thereby released via the second heat exchanger.

Vehicle components to be temperature-controlled, which are not arranged in the oil circuit or the cooling system, are preferably temperature-controlled by means of a water circuit. The water is often a water-glycol mixture. The water of the water circuit is conveyed (by means of a third circulation pump) in a third circulation direction via a third heat exchanger. The third heat exchanger is preferably formed for heat transfer with the environment or the ambient air, wherein a fan is preferably provided for a (forced) convection on the third heat exchanger.

It should be noted that the respective components are also heatable in the oil circuit and/or the water circuit, for example in winter temperatures, wherein but the main state here is also the dissipation of waste heat. The respective circulation direction is also reversible, where appropriate.

In an advantageous embodiment, a pulse inverter [PWR] for an electric traction machine to be temperature-controlled by the cooling system with the coolant oil is arranged in the water circuit for temperature control, i.e. not a component to be temperature-controlled in the cooling system with the coolant oil. It is advantageous to keep the number of components in said cooling system for an electric traction machine low. With a pulse inverter, the use of a (dielectric) coolant is not necessary. It is therefore advantageous to arrange the pulse inverter outside of said cooling system.

It is furthermore provided in an advantageous embodiment of the thermal management module that the water circuit be connected to the first heat exchanger of the cooling system for an electric traction machine for heat transfer, preferably as the only fluid-bound heat transfer of the cooling system to the environment, wherein, preferably in the third circulation direction of the water circuit, a pulse inverter for an electric traction machine is arranged upstream of the first heat exchanger.

It is provided here that the cooling system with the cooling oil and the water circuit be heat-coupled with one another, i.e. the water circuit is set up by means of the (first) heat exchanger for temperature control of the coolant oil. Thus, in the first heat exchanger, for example when cooling the electric traction machine (technically without a fluid exchange), the heat is released from the coolant oil to the water in the water circuit.

In a preferred embodiment, no further (forced) convection is provided for temperature control of the electric traction machine (and preferably also no further components in the cooling system) and for dissipating heat from the coolant oil. Rather, the first heat exchanger is then the only unit of the cooling system for transferring heat, namely with the water circuit.

In a preferred embodiment, the pulse inverter is arranged in the (third) circulation direction of the water circuit upstream of the first heat exchanger so that the temperature gradient above the pulse inverter is as high as possible, while the temperature gradient above the first heat exchanger (due to the mostly very large heat output of the electric traction machine) is still sufficient.

In one advantageous embodiment, a reversing valve is provided for reversing the (first) circulation direction. In one embodiment, the coolant oil then passes through a separate return channel. Preferably, the same conduit is used for both directions.

Thus, in the main direction, the order of the components is (beginning with the first circulation pump):

1. the first circulation pump;
2. the first heat exchanger;
3. the electric traction machine; and
4. the expansion tank.

In this case, a filter medium according to the above description is arranged within the main direction in and/or at the expansion tank.

And, in the auxiliary direction, the order of the components is:

1'. the first circulation pump;
2'. the expansion tank;
3. the first heat exchanger; and
4'. the electric traction machine.

It should be noted that possible further components in the cooling system are also supplied in reverse, or only a few or exclusively the aforementioned three components are supplied in reverse order.

It is furthermore provided, in an advantageous embodiment of the thermal management module, that the water circuit also be connected to the second heat exchanger of the oil circuit for heat transfer, preferably as the only fluid-bound heat transfer of the cooling system to the environment, wherein, preferably in the third circulation direction of the water circuit, the first heat exchanger is arranged upstream of the second heat exchanger.

It is provided here that the oil circuit and the water circuit be heat-coupled to one another, i.e. the water circuit is formed by means of the (second) heat exchanger for temperature control of the oil. In the second heat exchanger, for example, when the transmission cools (technically without liquid exchange), the heat from the oil in the oil circulation is released to the water in the water circuit.

In a preferred embodiment, no further (forced) convection is provided for temperature control of the transmission (and preferably also not for further components in the oil circuit) and for dissipating heat from the oil. Rather, the second heat exchanger is then the only unit of the oil circuit for heat transfer, namely with the water circuit.

In a preferred embodiment, the first heat exchanger is arranged in the (third) circulation direction of the water circuit upstream of the second heat exchanger so that the temperature gradient above the first heat exchanger is as large as possible, while the temperature gradient above the second heat exchanger (due to the mostly higher permissible temperature level in a transmission in comparison to an electric traction machine) is still sufficient.

According to an aspect, a powertrain for a motor vehicle is provided, comprising at least the following components:

at least one electric traction machine to provide a torque;

at least one propulsion wheel for propelling the relevant motor vehicle by means of a torque of the electric traction machine;

at least one transmission for conducting a torque between the electric traction machine and at least one of the propulsion wheels; and a cooling system according to one embodiment as per the above description for at least one of the electric traction machines and/or a thermal management module according to one embodiment according to the above description for at least one of the electric traction machines, at least one of the transmissions and at least one vehicle component, and preferably a pulse inverter for at least one of the electric traction machines.

A powertrain is now described here, which comprises at least one electric traction machine by means of which torque is generated. The torque of the respective electric traction machine is transferable via a transmission to at least one propulsion wheel. The at least one propulsion wheel is formed so as to drive the motor vehicle forward. The temperature control of the components of the powertrain is performed by a cooling system or a thermal management module comprising a cooling system according to one embodiment according to the above description. For the third heat exchanger, the air of the environment is preferably used, namely passively by means of driving wind and/or actively by means of a fan.

In an aspect, a motor vehicle is provided, comprising a chassis having a transport compartment and a powertrain according to an embodiment according to the description above for driving the motor vehicle forward.

The motor vehicle is provided for transporting at least one passenger and/or goods and comprises a passenger compartment and/or a cargo compartment. The motor vehicle is driven via the at least one propulsion wheel by means of the torque of at least one of the electric traction machines.

Embodiments of the invention described above are explained in detail below with reference to the accompanying drawings, which show preferred configurations, in light of the relevant technical background. The invention is not limited in any way by the purely schematic drawings, wherein it is noted that the drawings are not true to size and are not suitable for defining proportions. The figures show:

In FIG. 1, a cooling system 2 with two filter stages 19, 20 is shown in a schematic circuit diagram. The cooling system 2 comprises a circuit system 13, comprising a plurality of conduits and/or conduit portions between the components of the cooling system 2. Within the circuit system 13, the coolant oil 5 is encapsulated from an environment 32 and thus, a loss of gaseous contents as well as entry of (for example air) moisture and (for example spray) water from the environment 32 occurs at most in negligible amounts (for example as a result of leakages). A first circulation pump 14 is provided for circulating the coolant oil 5. A pressure gradient is generated by the circulation pump 14, resulting in a first circulation direction 15 in the circuit system 13. In one embodiment, the circulation pump 14 is reversibly operable, however the first circulation direction 15 is the main direction of operation, at least when dissipating waste heat from the integrated electric traction machine 11.

The electric traction machine 11 is integrated into the cooling system 2 for temperature control by supplying the coolant oil 5 via a motor input connection 16 and removing the introduced coolant oil 5 from the electric traction machine 11 again via a motor output connection 17. The coolant oil 5 heated (or if necessary cooled) in the electric traction machine 11 can be temperature-controlled by means of a first heat exchanger 18 which is formed to transfer heat between two fluids, i.e. the coolant oil 5 and a further fluid (for example water or ambient air).

Between the electrical traction machine 11 and the first circulation pump 14, an expansion tank 1, and between the first heat exchanger 18 and the electrical traction machine 11, an oil filter 33 is arranged. In this exemplary embodiment, the oil filter 33 comprises a first filter stage 19 and a second filter stage 20 of a (first) filter medium 10 and the expansion tank 1 comprises a (second) filter medium 10. The (respective) filter medium 10 is provided for removing particles and/or water from the coolant oil 5, so that water can be or is reliably removed from the circuit. This also applies to particles.

The first filter stage 19 (in this case purely optionally arranged in the oil filter 33) is made as a separator such that water and particles are prevented from passing on via mechanical and/or electrostatic rejections by means of a hydrophobically coated screen fabric. Free water (for example water droplets) in the coolant oil 5 is prevented from flowing onward. Furthermore, in this embodiment example, at the lowest point of the oil filter 33, a collection tank 21 is arranged, which permanently separates water and/or particles from the coolant oil 5 in large quantities with the screen fabric. In this embodiment, the collection tank 21 is integrated into the housing of the oil filter 33.

The second filter stage 20 in this embodiment example is (purely optionally) arranged in the oil filter 33, however the entire filter medium 10 of the expansion tank 1 is preferably made similarly and comprises a binding agent. A binding agent is an efficient adsorbent or absorber for water (see FIG. 2). Therefore, in addition to free water, dissolved water (i.e. water bound at a molecular level in the coolant oil 5 or a component of the coolant oil 5) is also separable from the coolant oil 5, and can thus be prevented from passing on. Due to the different densities of water and coolant oil 5, the coolant oil 5 in the expansion tank 1 floats above the water (exaggeratedly shown in the expansion tank 1 here for clarification). The binding agent is provided therein at the lowest point of the expansion tank 1, so that the adsorbed or absorbed water is additionally kept separate by gravity. It should be noted that, however, specifically in order to remove dissolved water, the second filter stage 20 preferably completely covers a flow area, i.e., the entire coolant oil 5 is conveyed through the second filter stage 20 (at least within the framework of the technically and economically sensible limits).

Figure 2:
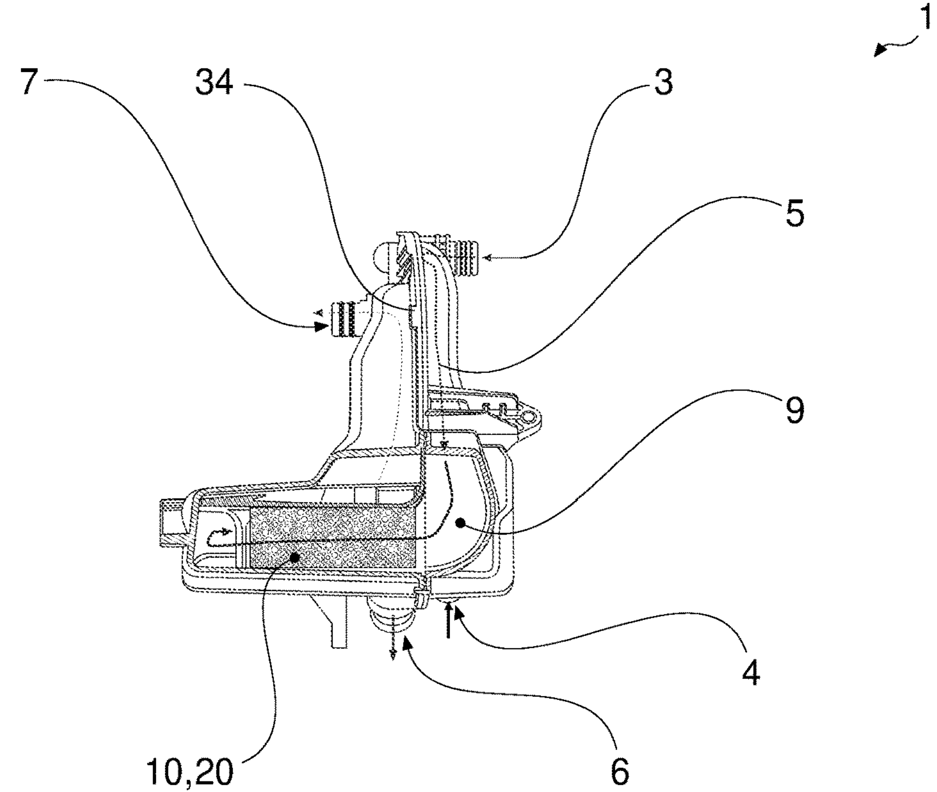
FIG. 2 illustrates an expansion tank with a filter medium in a breakout view.

In FIG. 2, the expansion tank 1, for example, can be used in the cooling system 2 according to FIG. 1, with a filter medium 10 as shown in an exploded view. According to the illustration, a first inlet 3 is arranged at the right upper end of the expansion tank 1, which is adapted to introduce the coolant oil 5. In this embodiment example, a second inlet 4 is additionally arranged at the lower right end of the expansion tank 1, as shown in the illustration, wherein it is formed so as to conduct the coolant oil 5 into it. The coolant oil 5 is prevented from flowing to the left as shown due to a centrally arranged partition 34, and therefore flows partially through the connecting channel 9. Here, the connecting channel 9 extends into the image plane and widens towards the first outlet 6. The flow of the coolant oil 5 is indicated by the arrow (where not obscured, by a solid line; and where obscured, by a dashed line).

Furthermore, a second outlet 7 is provided, via which gas 8 can exit or also enter, wherein the gas 8 (or at least bubble-formed gas 8 within the coolant oil 5) is separated to a large extent within the expansion tank 1 as a result of the density difference from the coolant oil 5, and flows to the higher second outlet 7. Between the first outlet 6 and the second outlet 7, a filter medium 10 or, in this embodiment example, made as a second (but preferably only) filter stage 20, i.e. made as a binding agent, is arranged.

The binding agent is made such that the remaining water and/or particles in the coolant oil 5 are adsorbed or absorbed in the binding agent. In the advantageous embodiment according to FIG. 1, the amount of water and/or particles is reduced due to the first filter stage 19 of the (first) filter medium 10 upstream of the motor inlet connection 16 upstream in the first recirculation direction 15, such that replacement or regeneration of the second filter stages 20 is not necessary over a desired service life. At the same time, over this service life, no water is contained in the coolant oil 5, or at least a water content in the coolant oil 5 is sufficiently low for unimpeded operation of the cooling system 2.

Figure 3:
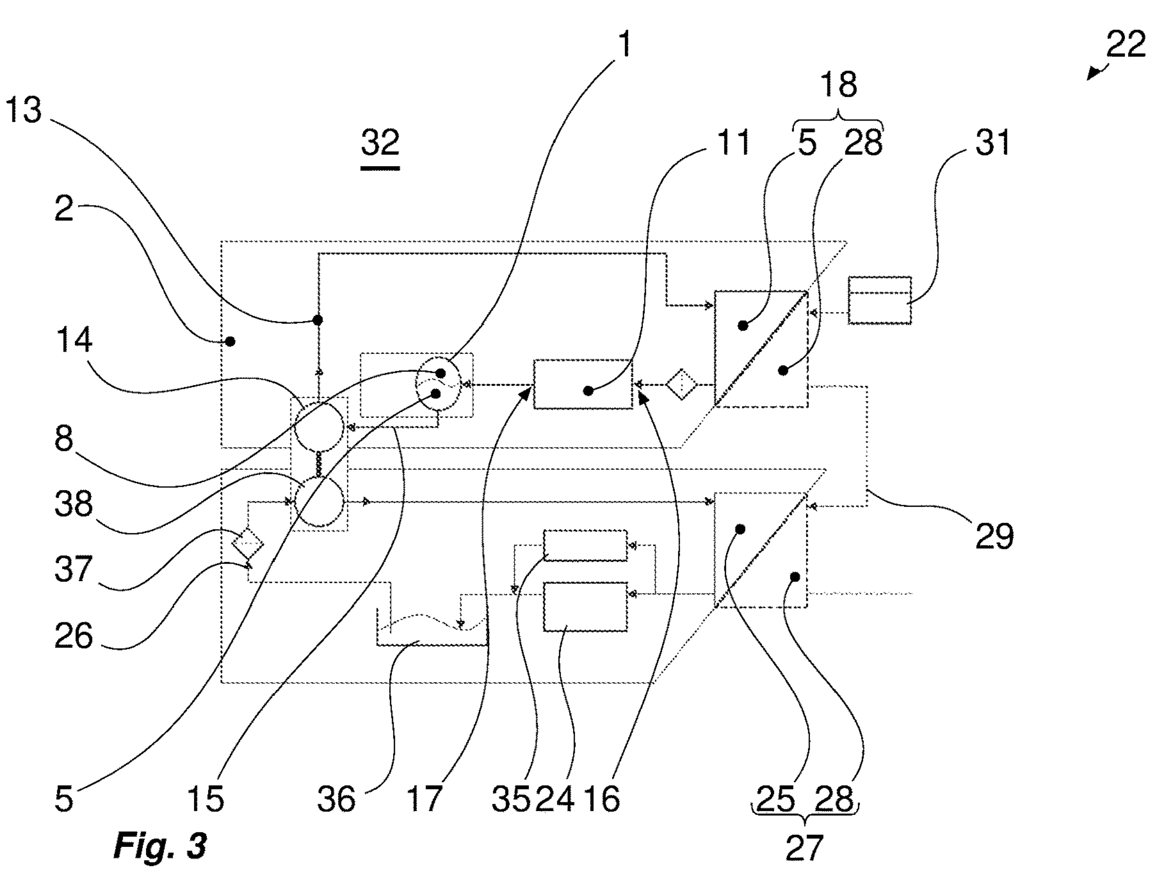
FIG. 3 illustrates a thermal management module in a schematic diagram.

In FIG. 3, a thermal management module 22 is shown in a schematic diagram, comprising a cooling system 2 for an electric traction machine 11. A first heat exchanger 18 of the cooling system 2 is formed here for heat transfer with a water circuit 28 (shown in a section here), so that the coolant oil 5 of the circuit system 13 of the cooling system 2 and the water (mixture) of the water circuit 28 are in a heat exchange with each other. A second heat exchanger 27 of an oil circuit 25 for a transmission 24 is also formed here for heat transfer with the water circuit 28 (shown in a section here), so that the oil of the oil circuit 25 and the water (mixture) of the water circuit 28 are in a heat exchange with each other.

In the water circuit 28, a pulse inverter 31 for the electric traction machine 11 to be temperature-controlled in the cooling system 2 is arranged here, namely in the (third) circulation direction 29 of the water circuit 28 upstream of the first heat exchanger 18 of the cooling system 2 with the coolant oil 5. In addition, the second heat exchanger 27 is arranged downstream of the first heat exchanger 18 in the third circulation direction 29.

In the oil circuit 25, in the (second) circulation direction 26, a transmission 24 and a transmission component 35 are arranged downstream of the second heat exchanger 27, which are connected here in parallel. Subsequently, an oil sump 36, consequently a coarse filter 37 and finally (shown in the illustration) a second circulation pump 38, are arranged in the oil circuit 25. The second circulation pump 38 is here (optionally) made as a tandem pump with a first circulation pump 14 of the cooling system 2 with the coolant oil 5.

The cooling system 2 comprises a circuit system 13 in which the following components are arranged in the (first) circulation direction 15:

1. the first circulation pump 14;
2. the first heat exchanger 18;
3. the oil filter 33 having the first filter stage 19;
4. the electric traction machine 11, which is perfused via a motor input connection 16 and a motor output connection 17; and
5. an expansion tank 1 with the second filter stage 20.

The expansion tank 1 is filled partly with the coolant oil 5 (and possibly with the remaining water and/or particles) and partly with a gas 8, so that a pressure increase resulting from a temperature-related volume increase can be compensated or at least mitigated by means of the compressible gas 8. A filter medium 10 as described above is also preferably provided within the expansion tank 1. By means of the filter medium 10, it is ensured that, for example, moisture from the environment 32 is prevented from entering the cooling system 2. It should be noted that, in the shown embodiment of the thermal management module 22, no heat exchanger is provided from the cooling system 2 and the oil circuit 25 for heat transfer to the environment 32. Rather, the first heat exchanger 18 and the second heat exchanger 27 are coupled to the water circuit 28.

Figure 4:
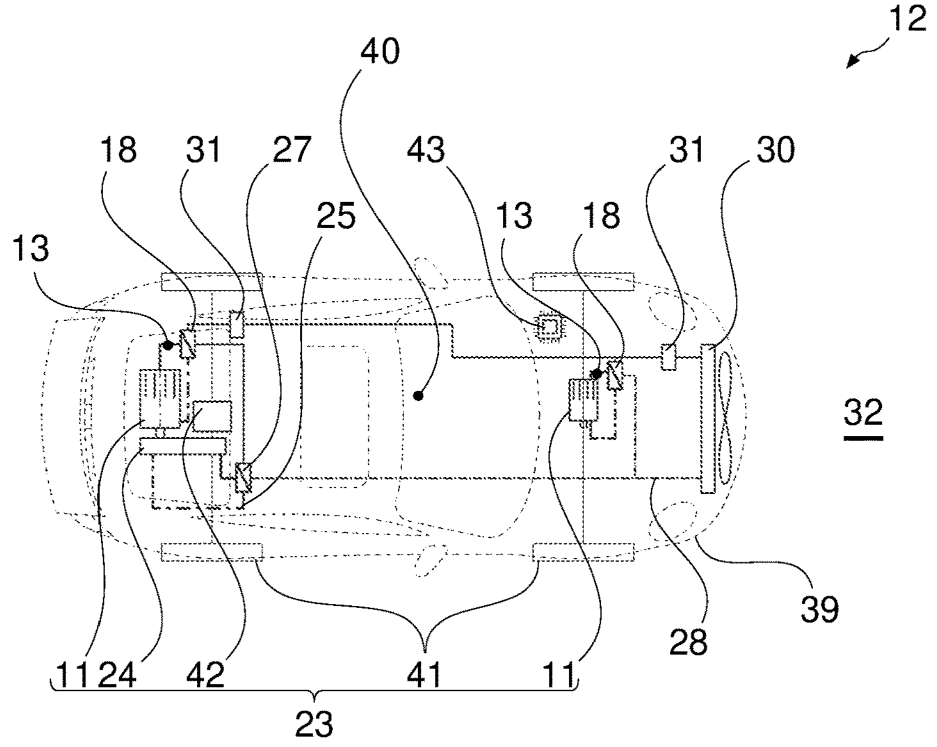
FIG. 4 illustrates a motor vehicle having a thermal management module in a schematic top view.

In FIG. 4, a motor vehicle 12 with a thermal management module 22 is shown in a schematic top plan view with a powertrain 23. The motor vehicle 12 comprises a transport compartment 40, for example a passenger compartment, approximately in the center of its chassis 39, and four propulsion wheels 41 to propel the motor vehicle 12 on and to the side of its chassis 39. An electric traction machine 11 (herein optionally coaxial) at the front and a further electric traction machine 11 (herein optionally arranged parallel to the axle) at the rear, as well as a gearbox 24 and a differential 42 at the rear, are comprised; wherein the differential 42 is preferably included in the oil circuit 25. A pulse inverter 31 is provided for each of the front and rear electric traction machines 11. A water circuit 28 is set up for temperature control of the pulse inverter 31 and the first heat exchanger 18 and the second heat exchanger 27, wherein the heat of the water circuit 28 can be dissipated to the environment 32 via a third heat exchanger 30 (shown here with a fan). The leading conduit is shown here with a solid line and the return line respectively as a dotted line so that the (third) circulation direction 29 of the water circuit 28 runs counterclockwise in the illustration. This is similarly shown in the cooling system 2 on the electric traction machines 11 and in the oil circuit 25. For example, the cooling systems 2, the oil circuit 25, and the water circuit 28 are made as shown in FIG. 1 and FIG. 3 (at least sectionally). Furthermore, a processor 43 is indicated here, by means of which the necessary control and/or control of the shown (and possibly further) components can be implemented. The processor 43 is made as a CPU, for example, and/or is part of an on-board computer of the motor vehicle 12.

Direct cooling of an electric traction machine with extremely low electric conduction losses is feasible with the expansion tank or cooling system described here.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

| | |
|---|---|
| 1 | expansion tank |
| 2 | cooling system |
| 3 | first inlet |
| 4 | second inlet |
| 5 | coolant oil |
| 6 | first outlet |
| 7 | second outlet |
| 8 | gas |
| 9 | connection channel |
| 10 | filter medium |
| 11 | electric traction machine |
| 12 | motor vehicle |
| 13 | circuit system |
| 14 | first circulation pump |
| 15 | first circulation direction |
| 16 | motor input connection |
| 17 | motor output connection |
| 18 | first heat exchanger |
| 19 | first filter stage |
| 20 | second filter stage |
| 21 | collection tank |
| 22 | thermal management module |
| 23 | drive train |
| 24 | Transmission |
| 25 | oil circuit |
| 26 | second circulation direction |
| 27 | second heat exchanger |
| 28 | water circuit |
| 29 | third circulation direction |
| 30 | third heat exchanger |
| 31 | pulse inverter |
| 32 | environment |
| 33 | oil filter |
| 34 | partition |
| 35 | gearbox component |
| 36 | oil sump |
| 37 | coarse filter |
| 38 | second circulation pump |
| 39 | chassis |
| 40 | transport compartment |
| 41 | drive wheel |
| 42 | differential |
| 43 | processor |

The invention claimed is:

1. An expansion tank for a cooling system comprising:
at least one inlet for a coolant oil;
a first outlet for the coolant oil;
a second outlet for a gas; and
a connecting channel between the at least one inlet and the first and second outlets,
wherein, by a horizontal offset, one of the inlets for the coolant oil and the second outlet for a gas are always arranged above the first outlet for the coolant oil in an installation situation in any operating state, and
wherein a filter medium for removing particles and/or water from the coolant oil is provided between the at least one inlet and the first outlet.

2. The expansion tank according to claim 1, wherein the filter medium is arranged below the at least one air inlet and such that the coolant oil must flow past the filter medium to reach the first outlet from the at least one inlet.

3. The expansion tank according to claim 1, wherein the filter medium is arranged at a lowest point of the connecting channel, the filter medium being configured to remove water from the coolant oil and configured such that water in the coolant oil in the connecting channel is exposed to a low flow rate or shear flow so as to not mingle with the coolant oil.

4. The expansion tank according to claim 1, wherein the connecting channel extends downward toward a bottom of the expansion tank, laterally along the bottom of the expansion tank in a first direction, and then laterally in a second direction different from the first direction.

5. The expansion tank according to claim 4, wherein the second direction is perpendicular to or opposite to the first direction.

6. The expansion tank according to claim 1, wherein a horizontal extension of the connecting channel is approximately the same as a vertical distance from the at least one air inlet and a bottom of the connecting channel.

7. The expansion tank according to claim 1, further comprising a second inlet for the coolant oil, the second inlet being arranged at a same height as the first outlet.

* * * * *